United States Patent [19]

McLemore, Jr.

[11] Patent Number: 4,833,813
[45] Date of Patent: May 30, 1989

[54] INFLATABLE HUNTING BLIND

[76] Inventor: Ralph S. McLemore, Jr., Route 3, Box 637, Hattiesburg, Miss. 39401

[21] Appl. No.: 190,599

[22] Filed: May 5, 1988

[51] Int. Cl.⁴ .................... A01M 31/00; A63H 33/02; E04H 15/20
[52] U.S. Cl. .............................................. 43/1; 52/2; 446/220; 135/106; 135/901
[58] Field of Search ............... 43/1; 52/2 H, 2 J, 2 K, 52/2 M, 2 N; 135/90, 105, 106, 901, 902, 2; 446/220

[56] References Cited

U.S. PATENT DOCUMENTS

| | | | |
|---|---|---|---|
| 2,689,812 | 9/1954 | Mollica et al. | 52/2 J |
| 3,493,228 | 2/1970 | Hicks et al. | 446/220 |
| 3,540,170 | 11/1970 | Flowers | 43/1 |
| 3,936,969 | 2/1976 | Richard | 43/1 |
| 4,384,435 | 5/1983 | Polise et al. | 52/2 J |

FOREIGN PATENT DOCUMENTS 623469  6/1981  Switzerland ............... 52/2

Primary Examiner—Nicholas P. Godici
Assistant Examiner—William Scott Andes
Attorney, Agent, or Firm—Alexander F. Norcross

[57] ABSTRACT

An inflatable hunting blind is constructed of a series of internally interconnected, vertically stacked horizontal annular air chambers, each constructed of lightweight vinyl chloride, polyethylene or any vinyl plastic, such as polyvinyl chloride, or the like interconnected vertically by use of plastic welding but containing large internal air passages for the mutual inflation of all the air chambers simultaneously. The structure is provided with an external camouflaged pattern to obscure the appearance of the device. A mouth inflatable chuck valve is provided in an upper torus and a series of ground stake loops are provided in a lower torus, permitting the structure to be fastened to the ground and also to be inflated by blowing, without the use of external pumps and the like.

The entire device is built of a lightweight plastic so as to provide a totally collapsible, very lightweight hunting blind, having a compact stowed aspect which is easily backpacked but which is capable of erection to fully obscure the appearance of a hunter.

2 Claims, 1 Drawing Sheet

INFLATABLE HUNTING BLIND

BACKGROUND OF THE INVENTION

This invention relates to a hunting blind of the type used to obscure an animal's view of a hunter's presence in a field hunting situation.

There have been numerous prior attempts to create portable game blinds, including inflatable blinds.

U.S. Pat. No. 3,540,170 to Flowers discloses an inflatable portable blind having a conical shape with vertically extending inflatable tubes. Please note that the blind has a specifically described and claimed tubular member at both its upper and lower periphery and that the generally vertical direction of the main inflatable body permits a doorlike effect to be achieved.

U.S. Pat. No. 3,936,969 to Richard discloses an inflatable blind having a singular tubular lower member, an inflatable seat member affixed thereto and then a plurality of inflatable vertically arising sections which may be disguised or camouflaged.

U.S. Pat. No. 3,052,054 to Littleton discloses a vertically inflatable blind that does not enclose the hunter, but rather that provides a shield behind which the hunter may crouch.

Other forms of portable game blinds are shown in U.S. Pat. No. 2,992,503 to Webb disclosing a sectional, rigid game blind designed to resemble a tree stump; and U.S. Pat. No. 4,164,089 showing a two section portable blind which can be worn as a poncho. FIG. 4 of U.S. Pat. No. 4,164,089 shows an alternate form of supporting framework using inflatable tubular structure rather than the preferred rigid metallic or plastic structure.

U.S Pat. No. 4,364,193 to Visco discloses a two piece portable blind of cloth upon frame construction.

A related, but important patent, is U.S. Pat. No. 4,224,754 to Derryberry. This blind discloses a fabric and frame type blind in the form of a collapsible tubular cylinder of cloth having an internal spring to hold it erect.

SUMMARY OF THE INVENTION

The invention discloses a simplified form of portable hunting blind which uses a low pressure, field inflatable structure so as to achieve a blind having minimally adequate obscuration capabilities, and having maximum portability in that it collapses to a small, relatively lightweight, foldable structure which adds relatively little to the backpack load of a hunter in the field.

The blind is created from a series of vertically stacked, concentric annular rings, constructed of a lightweight plastic material such as polyethylene or any vinyl plastic, such as polyvinyl chloride, welded so that the rings create a repeated stacked annular structure of approximately five feet in height and two and a half feet in diameter when fully inflated. Each ring is connected to the ring above and below for the passage of air, and the entire structure is sealed by means of sonic welding or some similar technique known in the plastics' art for making a uniform sealed, enclosed structure. The outer appearance of the blind, having been partially broken up by the series of repeating horizontal lines inherent in the tubular structure, is further broken up by embossing or painting thereupon a broken field camouflage pattern so as to obscure the presence of any regular outlined form.

The blind, being made of a very lightweight plastic is easily moved and may be mouth inflated at any location to a fully erect status. The blind may then be readily placed over the individual and is easily secured to the ground by means of ground stakes pressed in through provided loops in the bottom of the blind. The hunter can readily kneel or sit within the blind structure and is thereby fully obscured from view. By restricting the height of the blind to five feet, the hunter merely has to stand to be head and shoulders clear of the blind for the purpose of aiming and shooting.

The tubular structure of the camouflaged exterior provides full obscuration in the presence of game, disguising the presence of a hunter or a manmade object; the total collapsibility of the blind and its extreme light weight permits it to be inflated by mouth pressure. This creates a very lightweight portable structure easily backpacked into the field, and easily collapsed, moved and re-erected as the occasion demands.

It is therefore an object of this invention to provide a portable hunting blind which is readily backpacked and positioned, while adding minimal equipment requirements to an already burdened hunter.

It is a further object of this invention to provide a portable hunting blind that provides minimum necessary obscuration of the hunter's shape, while providing minimum restrictions to the hunter's physical activities during still hunting.

It is a further object of this invention to provide a portable hunting blind which can be erected or taken down with minimum effort on the part of a hunter for ready movement while in the field.

It is a further object of this invention to provide a form of portable hunting blind which is sufficiently simple and has sufficiently few parts that it is not an undue burden on a field hunter.

It is a further object of this invention to disclose a hunting blind which has a minimal volume in a stowed configuration.

DETAILED DESCRIPTION OF THE PREFERRED EMBODIMENT

The essential problem with any portable blind for use in a hunting situation is that the blind must obscure the outlines of the human body from visual perception by game, which naturally implies that the blind must be bigger in some sense than the hunter; yet, because the hunter is required to backpack the blind along with all other equipment into the field, the blind must be of light weight and small size to insure this portability.

Most prior attempts to achieve such a portable blind have resulted in structures which are either spring loaded and therefore have a minimum size to which they can be collapsed, usually forming some circular device of extreme bulk; or they tend to be elaborate structures having multiple components, all of which must be carried.

Figure 1:
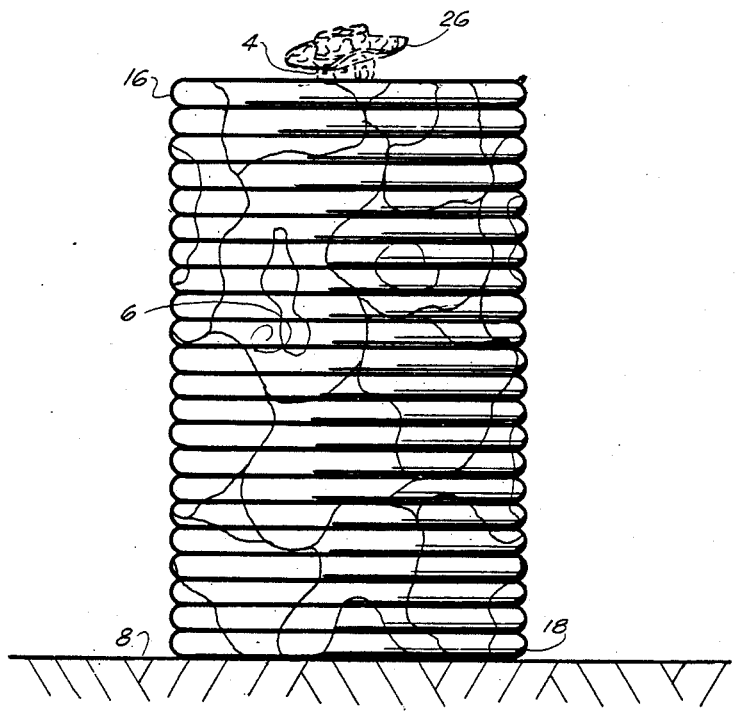
FIG. 1 is a side view of the invention, as erected, showing the camouflage pattern and the obscuration capabilities.
Figure 2:
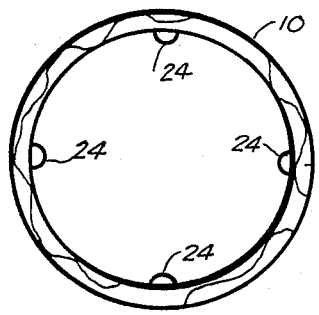
FIG. 2 is a top view of the invention.
Figure 3:
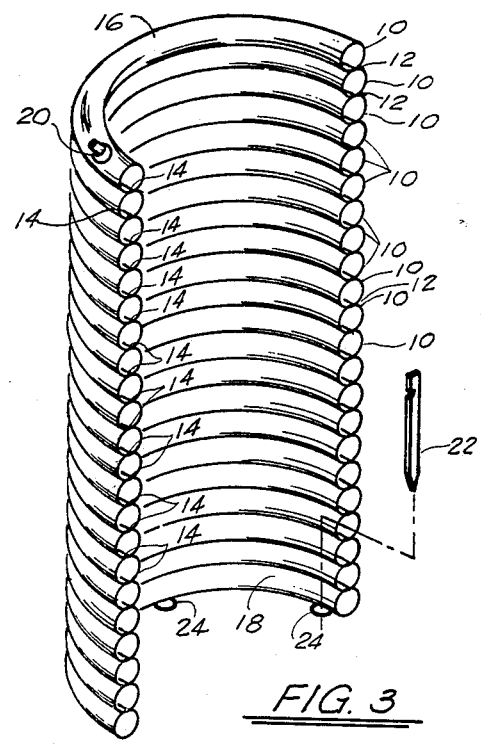
FIG. 3 is a vertical cut section of the invention.

Referring to FIG. 2, the portable blind 2 of the instant invention is seen to, in external aspect, be an essentially cylindrical shape within which a hunter may fully conceal himself. The overall outline of the blind is broken by an external mottled camouflaged pattern 6 which can easily be applied to the exterior material of the blind by any of the commonly known processes for dyeing or painting a pattern upon a plastic or fabric.

The blind is vertically mounted and secured to the ground 8 as will be hereinafter described.

In construction, the blind consists of a vertically stacked plurality of individual horizontal air inflatable toruses, or annular air chambers 10, each of which is an individual torus structure constructed of a lightweight plastic, preferably one of polyethylene or any vinyl plastic, such as polyvinyl chloride.

A plurality of the toruses 10 are horizontally aligned, vertically stacked and welded to one another along weld lines 12 by such techniques as chemical bonding or the more common heat welding.

Between each adjacent torus, multiple air passages 15 are provided, which can be readily done as is known in the art for building inflatable structures by providing non-sealed, flowthrough passages in the area of the weld lines 12. Thus, air can flow in volume between any of the annular tubes, including from the top annular tube 16 through to the bottom annular tube 18.

By making the air passages 14 of a sufficiently large size, by constructing each of the annular tubes 10 of a suitable lightweight polyethylene or any vinyl plastic, such as polyvinyl chloride material and because of the horizontal tubular structure of the blind, the overall structure may be inflated and held erect by considerably lower air pressure than would be the case in a spring loaded or a rubber structure. The structure is further self-supporting against bending at low inflation pressure, because of the annular structure, where a vertical air chamber would bend and collapse.

As a result, the blind may be inflated by normal breath pressure. A mouth operated air inlet valve 20 is mounted into and through top annular tube 16, for air passage into tube 16. Valve 20 is a mouth inflation valve, as well understood in the art, comprising, in general, a tubular structure extending through the sidewall of top sidewall 16 together with a rigid, spring like plastic inner flap which serves as an air retention valve. The construction of such valves or mouth or blown inflation of a lightweight polyethylene or any vinyl plastic, such as polyvinyl chloride structure is well known in the art and need not be described any further here.

Given the structure described above for the overall blind 2, it is readily apparent that by opening air valve 20, the overall blind 2 may be readily compressed into a totally non-inflated lightweight plastic structure, having the shape of a circle which then in turn may be easily folded into a much smaller shape. The weight of the structure is merely the weight of the polyethylene or any vinyl plastic, such as polyvinyl chloride, needed for the tubular structure shown. For a typical blind of a five foot height and a two and a half foot diameter the overall weight is considerably less than five pounds. The structure may be deflated and rolled into a bundle occupying a very small space, typically less than one third cubic foot. It thus constitutes a marginal burden on an already burdened backpacking hunter in field operation.

In use, when the hunter 4 reaches an area where it is desired to set up a blind for still hunting for a period of time, the collapsed blind 2 may be taken out and fully inflated by blowing through valve 20. Inasmuch as the structure creates a relatively rigid construction while using lightweight polyethylene or any vinyl plastic, such as polyvinyl chloride, no high pressure or mechanical pumps are required to achieve full inflation and the blind may be readily be brought to an erect status which the hunter 4 can easily lift over himself, surrounding himself with the obscuring properties of the camouflaged pattern provided by the blind. The blind is very lightweight and thus is best secured to the ground 8 by means of tent stakes 22, any form of conveniently notched to hook stake, which can be hand pressed or foot pressed into the ground 8, securing the blind through stake loops 24. There are preferably four internally extending stake loops 24 attached to bottom annular tube 18. The repeating annular structure of the blind produces a suitable rigid structure even though it is extremely lightweight and the four tent stakes are sufficient to affix it to the ground so as to prevent unnecessary movement which might alert or alarm animals. Minor swaying movement is of no consequence as this is commonly encountered in nature as when the wind blows trees or bushes.

The hunter 4 then may sit or squat within the blind. If he is wearing suitable camouflage headgear 26, he may of course, from time to time, peer over the blind. Alternatively, it is possible that arcuate sections 28 of one or more toruses 10 within the blind may be constructed of transparent plastic, or any vinyl plastic, such as polyvinyl chloride permitting the hunter to view out of the blind. In either event, the blind being of approximately a five foot height, the hunter 4 can readily stand when required and will be free for shooting over the top of it.

The blind can be readily removed and relocated as the hunting situation dictates by the simple process of releasing the air pressure, collapsing the blind to its original small shape, rolling it up and backpacking it to the new location.

It can thus be readily seen that although the structure described is a relatively simple one, it provides an unusually beneficial combination of features in comparison with the features of the prior art in terms of providing the requirements for a hunting blind in a shape and form which is both significantly lighter and significantly simpler to pack, carry, erect and move than any of the structures in the prior art. It can be further seen from the above description that variations are possible within this particular structure and thus the invention extends to those variations and equivalents as are encompassed by the claims.

I claim:

1. A portable hunting blind comprising:
   a generally cylindrical, erect structure having a height proximate the upper chest level of a hunter and a diameter approximately one half the height, further comprising:
      a plurality of horizontal annular air chambers, interconnectibly vertically stacked and sealingly fastened one upon the other, being of a lightweight, air retaining, flexible, non-stretching material, each annular air chamber intercommunicating with its adjacent annular air chambers for the ready passage of air;
      means adjacent an upper annular air chamber for applying low pressure air for inflating or releasing low pressure air for deflating the said annular air chambers;
      means affixed to the bottommost annular air chamber for temporarily affixing the blind to the ground;

a mottled, camouflaged pattern encompassing and covering the exterior visible surface of the blind; and at least one annular air chamber having an arcuate segment thereof being of a transparent flexible material.

2. The blind of claim 1 above wherein the flexible material further comprises:

a vinyl plastic.

* * * * *